United States Patent
Wys et al.

(10) Patent No.: US 8,925,705 B2
(45) Date of Patent: Jan. 6, 2015

(54) ELECTROMAGNETIC ONE-WAY COUPLING

(71) Applicants: Dennis N. Wys, Ann Arbor, MI (US); Norman J. Bird, Plymouth, MI (US)

(72) Inventors: Dennis N. Wys, Ann Arbor, MI (US); Norman J. Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 13/669,561

(22) Filed: Nov. 6, 2012

(65) Prior Publication Data

US 2013/0319812 A1    Dec. 5, 2013

Related U.S. Application Data (63) Continuation-in-part of application No. 13/488,699, filed on Jun. 5, 2012.

(51) Int. Cl.
*F16D 27/118* (2006.01)
*F16D 41/12* (2006.01)

(52) U.S. Cl.
USPC .............. 192/84.8; 192/46; 188/30; 188/82.1

(58) Field of Classification Search
USPC ....................................................... 192/84.8
See application file for complete search history.

(56) References Cited

U.S. PATENT DOCUMENTS

| | | | |
|---|---|---|---|
| 1,797,972 A * | 3/1931 | Bissell | 192/84.8 |
| 4,980,591 A | 12/1990 | Takanashi et al. | |
| 5,947,248 A | 9/1999 | Link | |
| 6,165,095 A | 12/2000 | Till et al. | |
| 6,182,527 B1 * | 2/2001 | Sander | 74/529 |
| 6,230,866 B1 | 5/2001 | Link | |
| 7,475,763 B2 | 1/2009 | Jegatheeson | |
| 8,006,819 B2 | 8/2011 | Dell et al. | |
| 8,403,123 B2 * | 3/2013 | Bird et al. | 192/84.31 |
| 2004/0159517 A1 * | 8/2004 | Thomas | 192/39 |
| 2007/0272509 A1 * | 11/2007 | Peschek et al. | 192/90 |
| 2011/0011694 A1 | 1/2011 | Swales et al. | |
| 2012/0103745 A1 | 5/2012 | Bird | |
| 2012/0103746 A1 | 5/2012 | Bird | |
| 2012/0103747 A1 | 5/2012 | Bird | |
| 2012/0228076 A1 * | 9/2012 | Tate et al. | 192/66.1 |

FOREIGN PATENT DOCUMENTS

| | | |
|---|---|---|
| JP | 05010352 | 1/1993 |
| JP | 09203419 | 8/1997 |

* cited by examiner

*Primary Examiner* — Gene Crawford
*Assistant Examiner* — Mark Manley
(74) *Attorney, Agent, or Firm* — James Dottavio; MacMillan, Sobanski & Todd, LLC (57) ABSTRACT

A one-way coupling includes a cam plate including cams, a pocket plate including pockets, struts, each strut located in one of the pockets, and an electromagnet for engaging one of the struts with one of the cams, including a coil, a core and poles that extend from the coil to said strut, a gap between the poles and the pocket plate exceeding a gap between the poles and said strut.

20 Claims, 7 Drawing Sheets

ELECTROMAGNETIC ONE-WAY COUPLING

This application is a continuation-in-part of pending U.S. application Ser. No. 13/488,699, filed Jun. 5, 2012.

BACKGROUND OF THE INVENTION

1. Field of the Invention

This invention relates generally to an overrunning, one-way coupling, such as a brake or clutch, whose engaged and disengaged states are selectively controllable.

2. Description of the Prior Art

Automatic transmissions employ hydraulically-actuated clutches and brakes to control power flow and establish the operating gear. A one-way clutch carries torque in one direction while overrunning in the opposite direction. A selectable one-way clutch can overrun in both directions, and can be commanded to lock clockwise, counterclockwise, or both directions. Electromagnetic clutches use electromagnetism to actuate the locking element or strut, as opposed to hydraulic pressure, a mechanical linkage, or centrifugal force.

One-way clutches typically include two races and a locking element, sometimes called a strut or rocker. The locking element or strut is a movable component that will wedge between the races and transfer torque in one direction. When torque is reversed, the locking element will "tuck" or rotate out of the locked position. One race (the pocket plate) houses the locking element and can be either rotating or stationary. The other race (the cam plate) contains features to interact with the locking element and transfer torque. This race also can be either rotating or stationary.

In an electromagnetic one-way clutch, the locking element is controlled through the use of electromagnetism. When current is applied to a coiled conductor an electromagnet is energized to either engage or disengage the locking element.

In order to function properly electromagnetic one-way clutches require a gap between the locking element and the magnet poles to generate a force necessary to actuate the locking element or rocker When the coil is energized, the rocker must rotate a particular distance to change the engagement state. This rotation closes the gap between the rocker and the poles of the coil. Consequently the gap between the poles and the rocker is greatest prior to energizing. To minimize the size of the coil it is beneficial to manage this gap.

Magnetically non-permeable material is frequently used to prevent flux leakage, but if too much flux leaks through the race rather than jumping the gap to the rocker the magnitude of the force generated may be insufficient to displace the rocker.

It is desirable to place the coil of an electromagnetic clutch as close as possible to the locking element. However doing so puts the coil in the area of the race that carries most force and deflection, thereby risking damage to the coil. Moving the coil to a safer location however compromises flux generation.

SUMMARY OF THE INVENTION

A one-way coupling includes a cam plate including cams, a pocket plate including pockets, struts, each strut located in one of the pockets, and an electromagnet for engaging one of the struts with one of the cams, including a coil, a core and poles that extend from the coil to said strut, a gap between the poles and the pocket plate exceeding a gap between the poles and said strut.

Because pocket plate is static and an electromagnet is located on the pocket plate and acting directly on the strut (i) dynamics issues related to having a strut and a spring, which is loosely contained in a pocket orbiting a centerline at high speed, are eliminated resulting in a significant increase in OWC reliability; (ii) the locking element can be commanded to either the engaged or disengaged position, whereas, if the electromagnet were on the cammed race the strut could only be commanded to engage; and (iii) rather than having a large diameter coil, very small coils can be wound realizing significant cost, material, weight, and package space savings as well as providing an increase in reliability. If one coil were used and it failed, the assembly would not function. If several small coils were used and one fails, degraded function results.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
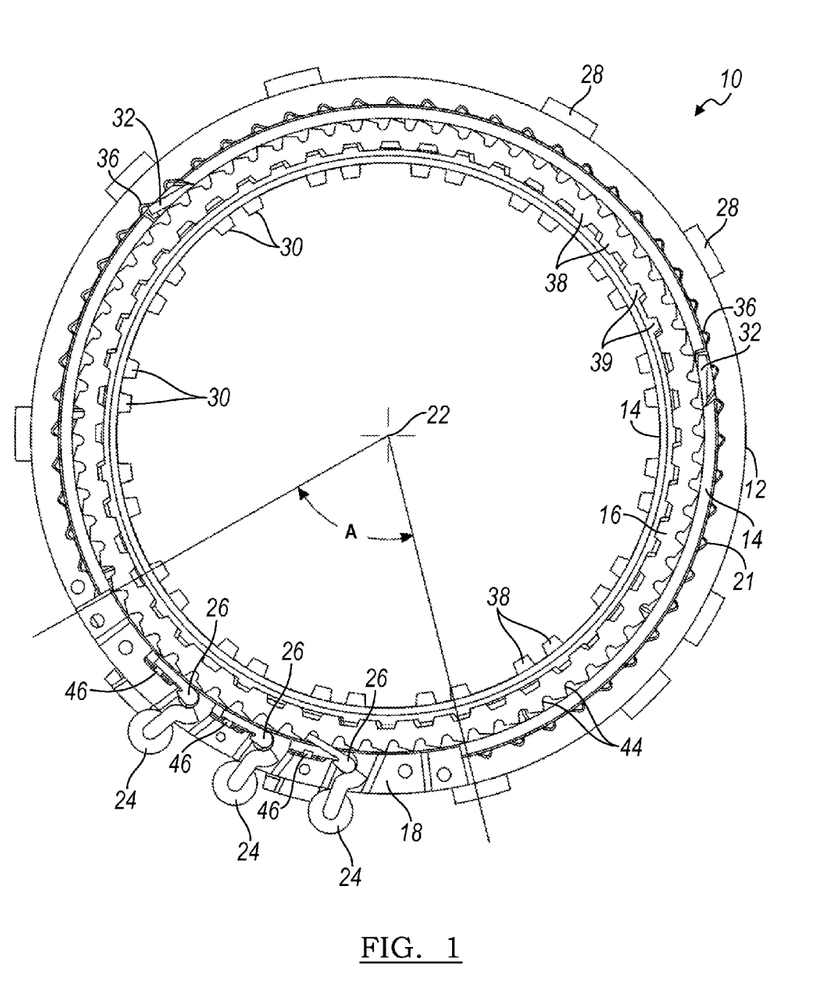
FIG. 1 is a front view of a selectable OWC in which the rings are aligned axially.
Figure 2:
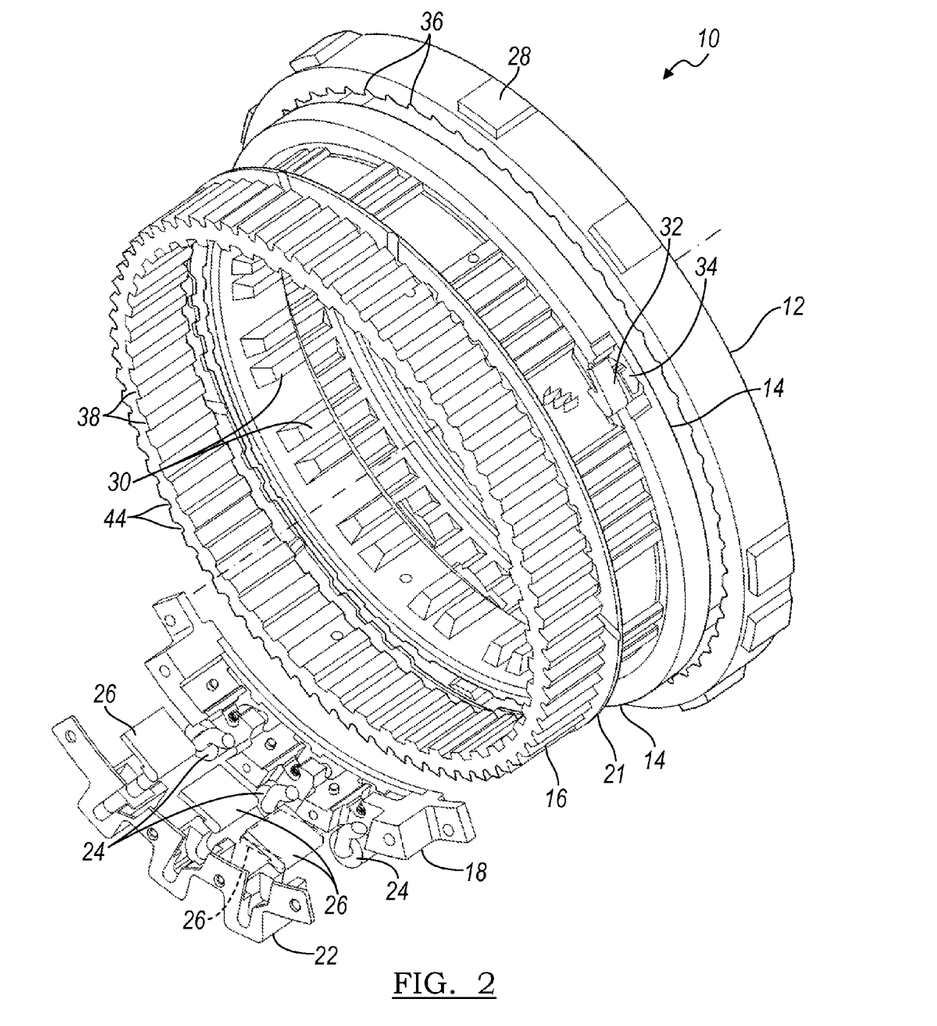
FIG. 2 is side perspective view of the selective OWC of FIG. 1.
Figure 3:
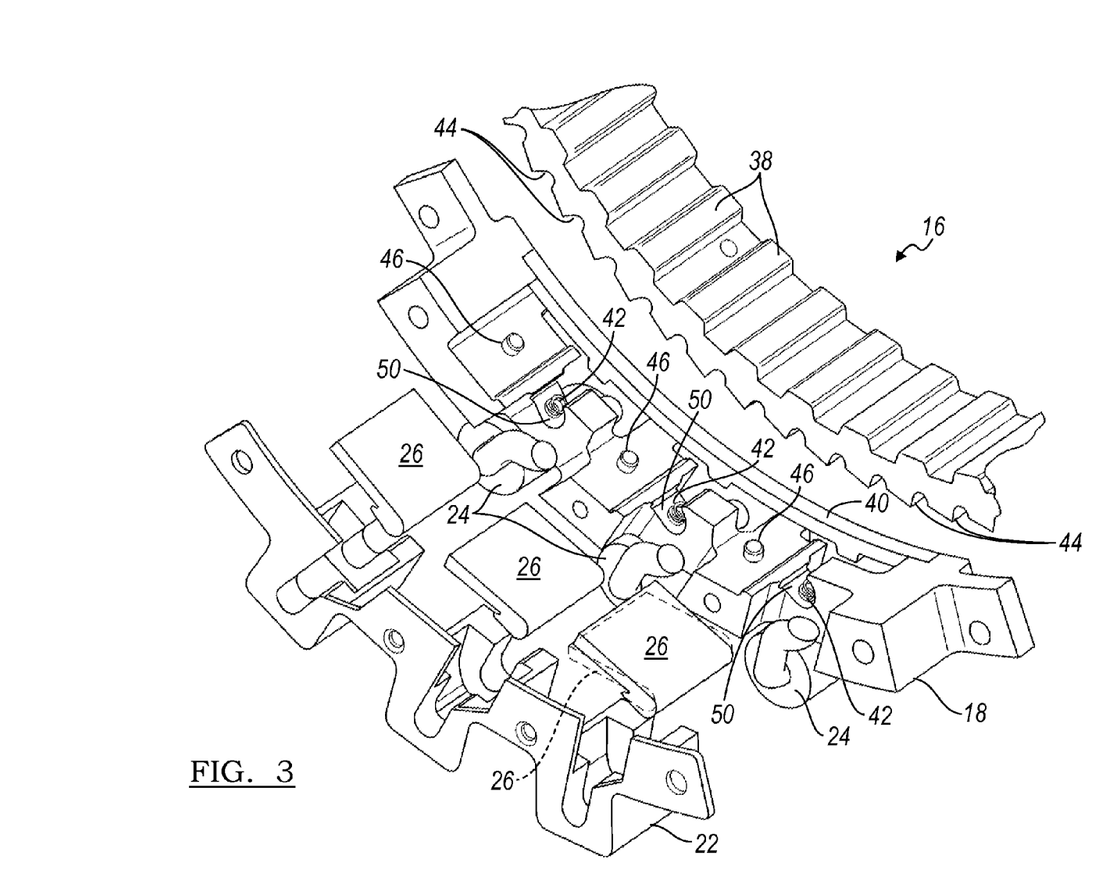
FIG. 3 is a perspective view of the electromagnets, second struts and second pocket plate of the selective OWC of FIG. 1.

The selectable OWB 10 shown in FIGS. 1, 2 and 3 includes a radial outer, first cam plate 12; a first pocket plate 14; a radial inner, second cam plate 16; and a radial inner, second pocket plate 18. A lead frame 20 is removed to show three coils 24 of electromagnets and three second struts 26. Plates 12, 14, 16, 18 are aligned with an axis 22.

The radial outer surface of first cam plate 12 is formed with spline teeth 28, by which cam plate 12 is secured against rotation to a stationary component of a transmission assembly, preferably to a transmission case. Similarly, the radial inner surface of first pocket plate 14 is formed with spline teeth 30, by which pocket plate 14 is secured to a reaction carrier of a transmission gearset. The carrier transmits torque to the OWB 10, causing the first pocket plate 14 second cam plate 16 subassembly to rotate.

First pocket plate 14 supports struts 32, each strut being urged by a respective spring 34 to pivot radially outward into engagement with one of the cams 36 on first cam plate 12, thereby driveably connecting first pocket plate 14 and first cam plate 12 and holding cam plate 12 against rotation. A retainer plate 21, located between an axial surface of pocket plate 14 and an axial surface of the second cam plate 16, prevents interference with the struts 32.

Centrifugal force produced on each of the struts 32 overcomes the force of the respective spring 34, which pivots the strut toward the cams 36. At high speed, each strut 32 pivots away from the cams 36, reducing the duty cycle on the spring. The first cam plate 12 must be a complete circle because the first pocket plate 14 can stop rotating at any angular position.

The first cam plate 12, first pocket plate 14 and struts 32 comprise a first drive coupling, in this case a one-way brake, which locks or engages when the first pocket plate rotates clockwise (when viewed as shown in FIG. 1) relative to the first cam plate, and overruns when the first pocket plate rotates counterclockwise (when viewed as shown in FIG. 1) relative to the first cam plate.

The inner surface of the second cam plate 16 is formed with internal spline teeth 38, which mesh with external spline teeth 39 on the outer surface of the first pocket plate 14.

The second pocket plate 18 is bolted to the first cam plate 12, which is fixed against rotation. A retainer plate 40 connects the opposite ends of the second pocket plate 18. Each of the second struts 26 is pivotably supported on the second pocket plate 18. A spring 42, preferably a helical spring, at each pocket location urges the respective strut 26 to pivot radially outward away from the cams 44 on the second cam plate 16, thereby opening a drive connection between the second cam plate 16 and the second pocket plate 18.

The second cam plate 16, second pocket plate 18 and struts 26 comprise a second drive coupling, also a one-way brake, which locks or engages when the first pocket plate 14 rotates counterclockwise (when viewed as shown in FIG. 1) relative to the first cam plate and electric current is supplied to coils 24, and overruns when the first pocket plate rotates clockwise (when viewed as shown in FIG. 1) relative to the first pocket plate 14.

In operation, when electric current is supplied to each coil 24 of the electromagnets, the magnetic field carried through the respective strut 26 causes the strut to pivot radially inward toward the cams 44, thereby closing a drive connection between the second cam plate 16 and the second pocket plate 18. When at least one of the struts 26 engages one of the cams 44, the second cam plate is fixed against rotation through struts 26, second pocket plate 18 and first cam plate 12.

When the coils are deenergized and the springs 42 pivot the second struts 26 out of engagement with cams 44, each second strut contacts a standoff or stop 46, supported on a radial surface of the second pocket plate 18. Preferable the stop is of a plastic or another material having relatively low magnetic permeability.

Because the coils 24 that produce electromagnets are supplied with electric current, they must be in the second pocket plate 18, which is a static race. Because magnetic flux forces struts 26 into engagement with the second pocket plate 18, i.e., the static race, unbalance is not an issue and pocket plate 18 may have a shape that is other than a full circle.

Figure 4:
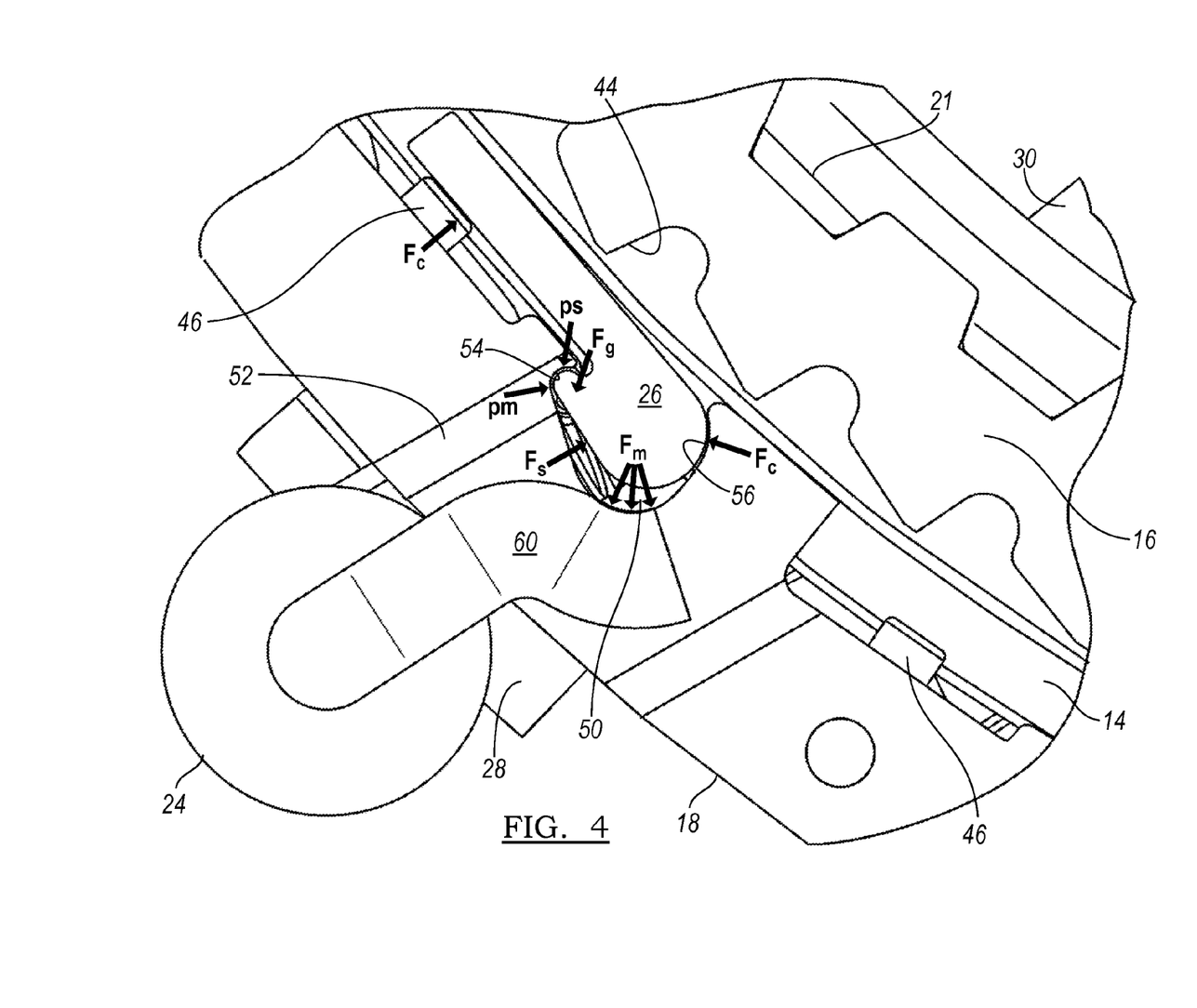
FIG. 4 is a side showing the second struts and coils assembled in the second pocket plate.

FIG. 4 shows one of the second struts 26 located in a pocket 50 formed in the second pocket plate 18, the strut being disengaged from the cams 44 of the second cam plate 16 and contacting stop 46 due to the effects of gravity and the force Fs produced by spring 42. The rotation of the 14-16 assembly in the overrun direction for strut 26 will also force strut 26 to disengage. Each spring 42 is located in a cylindrical recess 52 formed in plate 18.

Each pocket 50 is formed with concave cylindrical surface 54, on which a complementary convex surface of strut 26 pivots. Each pocket 50 is also formed with concave cylindrical surface 56, which guides movement of the strut 26 and limits its radial movement.

When electric current is supplied to coil 24, a magnetic field is produced such that its lines of magnetic flux or magnetic induction pass between the opposite poles 60, 61 and along the axial width of strut 26 due to its high magnetic permeability. The magnetic field produces distributed force Fm on the strut 26 and magnetically induces a moment on the strut, which causes the strut to pivot clockwise on surface 54 and into engagement with the cams 44 of the second cam plate 16. FIG. 1 shows one of the struts 26 engaged with one of the cams 44 and two struts disengaged from the cams 44 and contacting stops 46.

Surface 54 applies force Fg to the strut 26 at the pivot, and surface 56 applies force Fp to the strut.

A transmission controller opens and closes a connection between a source of electric current and the coils 24, because centrifugal force is not used to pivot the struts 26 into engagement with second cam plate 16.

Second pocket plate 18 extends along a circular arc that is less than 360 degrees. Radial lines drawn from axis 22 to the angular extremities of second pocket plate 18 form an included angle, whose magnitude is about 75 degrees. The second pocket plate 18 is large enough to contain the necessary number of struts 26, thereby reducing the cost and weight of the raceway and minimizing space required in the transmission.

FIG. 4 illustrates vectors representing forces applied to one of the second struts 26, wherein Fs is the force of spring 42, Fm is the magnetic force that is present when the electromagnet is energized, Fc is a force applied at contact surface 56, Fg is gravitational force due to the mass of the strut 26, ps is a force applied at pivot surface 54 when the electromagnet is deenergized, and pm is a force applied at pivot surface 54 when the electromagnet is energized.

As FIGS. 5-8 illustrate, the locking element or strut 26 is located on the stationary, second pocket plate 18, thereby allowing an electromagnet to act directly on the strut 26, rather than locating the electromagnet on the second cam plate 16, where each cam 44 acts as a pole to attract the locking elements 26.

Figure 5:
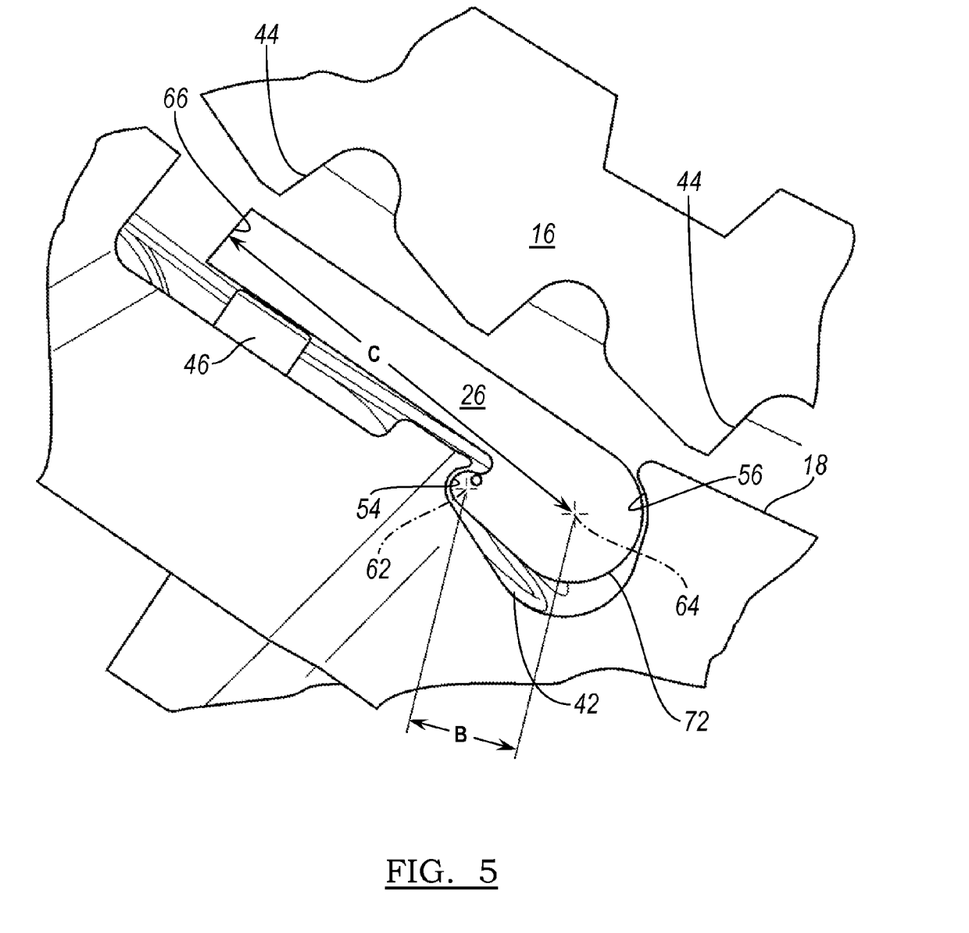
FIG. 5 is a side view showing a disengaged strut and its lever ratio.

In order to achieve the necessary pivotal displacement at the end 66 of the locking elements 26 that engages cams 44 while minimizing a gap 70 between the pole 60 and a convex strut surface 72 as well as a similar gap between the strut surface 72 and the pole 61 (best seen in FIG. 7), a lever ratio is designed into the locking element. As shown in FIG. 5, if the distance B from the pivot center 62 of surface 54 on the locking elements 26 to the center 64 of surface 56 is one unit, the distance C from center 64 to the end 66 is four units. This lever action allows maximum displacement at the end 66, while minimizing gap before actuation.

Figure 6:
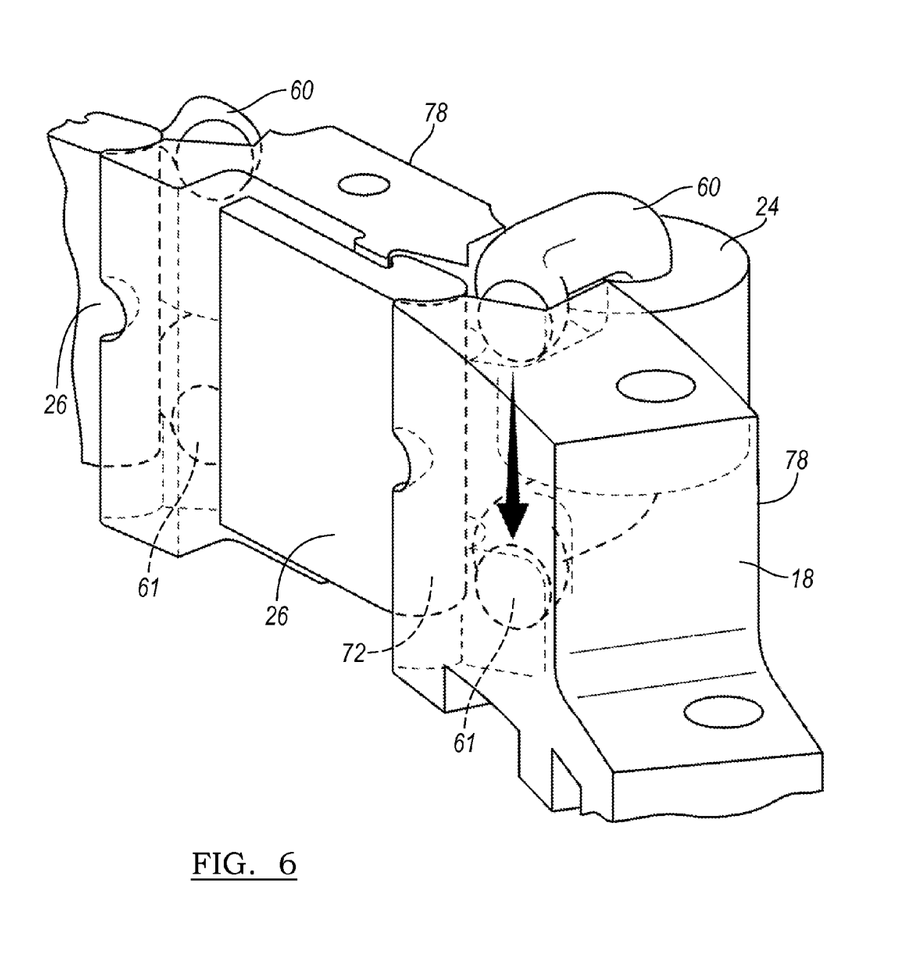
FIG. 6 is a perspective view showing the poles extending radially inboard from the coil toward a disengaged strut.

Materials that are magnetically permeable can lead to excessive flux leakage, which results in loss of function. FIG. 6 shows that the poles 60, 61 have the shape of a horse shoe with arms extending radially inward toward the respective strut 26 from a substantially vertical core, which pass through the coil 24 or electrically conductive wire.

Figure 7:
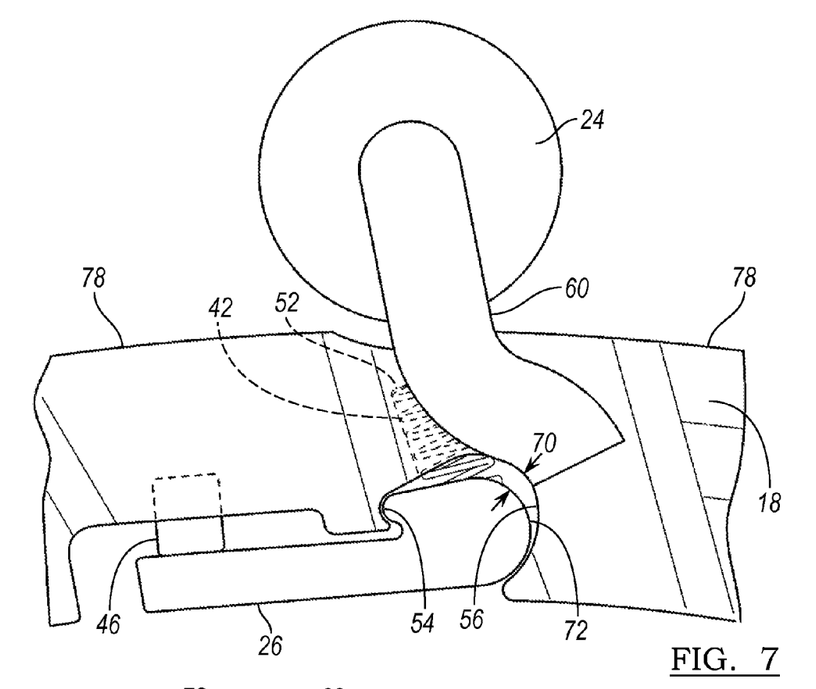
FIG. 7 is a side view showing a disengaged strut contacting its stop due to the force of a spring.
Figure 8:
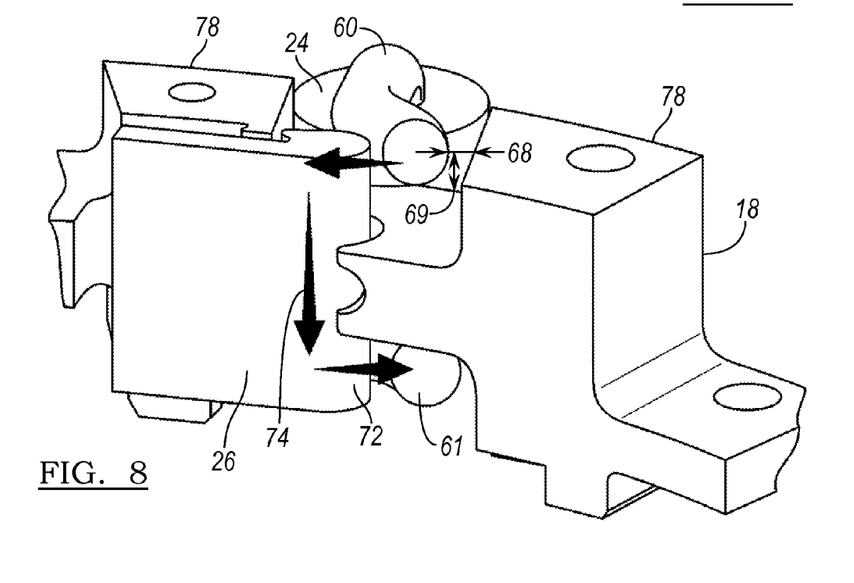
FIG. 8 is a perspective view showing the flux path from one of the poles, through the locking element and to the opposite pole.

To prevent excessive flux leakage, as FIGS. 7 and 8 best illustrate, the second pocket plate 18 is formed in the vicinity of the poles 60, 61 of the electromagnet such that the air gaps 68, 69 between the pole 60 and the second pocket plate 18 are greater than the gap 70 between the pole 60 and the locking element 26, and similar air gaps between the pole 61 and the second pocket plate 18 are greater than the air gap between the pole 61 and the locking element 26. Although some flux leakage occurs, the gap 70 from pole 60 to the locking element 26 and the gap from pole 61 to the locking element 26 create the path of least reluctance. Therefore, enough flux jumps these gaps from the poles 60, 61 to the locking element 26 to initiate pivoting of the locking element 26 toward the cams 44. As the locking element 26 pivots and its engagement with a cam 44 occurs, the gaps between the poles 60, 61 and the locking element 26 are reduced, causing an increase in the flux density and the magnitude of the magnetically-induced force on the strut 26.

In addition to applying a lever ratio to the locking element 26 and managing the gaps 68, 69, 70 relative to pole 60 as well as similar gaps to pole 61, it is necessary to direct a sufficient amount of flux (represented by the arrows in FIG. 8) to the locking element 26 in order to produce enough force to initiate pivoting of the locking element 26 toward the cams 44.

FIGS. 7 and 8 illustrate, the adjacent contour of the respective poles 60, 61 encircles and extends around a portion of the contour of the respective strut surface 72. This encirclement channels more flux into the most critical area 74 of the strut 26 than if the poles 60, 61 were simply terminated without extending along the surface 72, as in conventional electromagnets.

When the locking elements 26 engage cams 44 and torque is transferred between the second cam plate 16 and the second pocket plate 18, a significant amount of deflection can occur in the plates, particularly near the cams 44 that are engaged by the struts 26. Consequently it is important to locate the coil 24 away from the position with the highest deflection, otherwise the coil and its mountings could be damaged. The position with the highest deflection, however, this is usually the most desirable location for the coil 24 for proper flux generation. To address both issues, each coil 24 is located at the radial outboard surface 78 of the second pocket plate 18. After energizing, the system could contain residual magnetism leading to unwanted lockups. This is resolved by incorporating a degauss cycle at regular intervals.

As the strut 26 pivots into the engaged position, iron or steel passing through the magnetic field induces a secondary voltage in the coil 24. By monitoring the coil voltage for a voltage spike, the observer can determine whether the rocker has engaged. Absence of this voltage spike indicates a failure to engage.

In accordance with the provisions of the patent statutes, the preferred embodiment has been described. However, it should be noted that the alternate embodiments can be practiced otherwise than as specifically illustrated and described.

The invention claimed is:

1. A coupling device, comprising:
a cam plate including cams;
a pocket plate including a pocket;
a strut including a cam engagement end and an opposite convex end pivotably mounted in the pocket;
an electromagnet for engaging the cam engagement end with one of the cams, including a coil, a core and first and second axially spaced apart poles that each extend radially inward from the coil to respective first and second ends adjacent to the convex end, a gap between the first end and the pocket plate being longer than a gap between the first end and said strut and a gap between the second end and the pocket plate being longer than a gap between the second end and the strut.

2. The coupling device of claim 1, wherein:
a portion of the first pole adjacent to the first end has a curvature that partially encircles and follows a contour of a curved portion of the convex end.

3. The coupling device of claim 2, wherein:
a portion of the second pole adjacent to the second end has a curvature that partially encircles and follows a contour of a curved portion of the convex end.

4. The coupling device of claim 1, wherein the pocket plate is fixed against rotation and extends as an arc about an axis that is less than a full circle.

5. The coupling device of claim 1, wherein the coil is located at a radially outboard side of the pocket plate.

6. The coupling device of claim 1, wherein engagement of one of the cams by one of the struts induces a voltage spike in the coil indicating that said engagement has occurred.

7. The coupling device of claim 1, wherein:
the pocket is formed with a concave surface having a first center about which the strut pivots;
the strut includes a second convex surface contacting the concave surface, the convex end having a second center that is spaced by a first length from the first center, and the cam engagement end is spaced by a second length from the second center, the second length being greater than the first length.

8. The coupling device of claim 7, wherein the second length is about four times greater than the first length.

9. The coupling device of claim 1, wherein the pocket plate is formed of material having a first magnetic permeability; and
further comprising a stop located in the pocket adjacent to the cam engagement end between said strut and the pocket plate such that the cam engagement end is prevented from contacting the pocket plate, the stop formed of material having second magnetic permeability less than the first magnetic permeability.

10. A coupling device, comprising:
a cam plate including cams;
a pocket plate including a pocket;
a strut including a cam engagement end and an opposite curved convex end pivotably mounted in the pocket;
an electromagnet for pivoting the strut toward the cams and including axially spaced apart first and second poles that each extend radially inward to respective first and second ends adjacent to the convex end, a portion of the first pole adjacent to the first end having a curvature that partially encircles and follows a contour of a curved portion of the convex end.

11. The coupling device of claim 10, wherein:
a gap between the first end and the pocket plate is longer than a gap between the first end and said strut and a gap between the second end and the pocket plate is longer than a gap between the second end and the strut.

12. The coupling device of claim 10, wherein:
the pocket is formed with a concave surface having a first center about which the strut pivots;
the strut includes a second convex surface contacting the concave surface, the convex end having a second center that is spaced by a first length from the first center, and the cam engagement end is spaced by a second length from the second center, the second length being greater than the first length.

13. The coupling device of claim 10 wherein:
a portion of the second pole adjacent to the second end has a curvature that partially encircles and follows a contour of a curved portion of the convex end.

14. The coupling device of claim 10, wherein the pocket plate is formed of material having a first magnetic permeability; and
further comprising a stop located in the pocket adjacent to the cam engagement end between said strut and the pocket plate such that the cam engagement end is prevented from contacting the pocket plate, the stop formed of material having second magnetic permeability less than the first magnetic permeability.

15. The coupling device of claim 10, wherein the pocket plate is fixed against rotation and extends as an arc about an axis that is less than a full circle.

16. A coupling device, comprising:
a cam plate including cams;
a pocket plate including a pocket;
a strut including a cam engagement end and an opposite convex end pivotably mounted in the pocket, the strut having first and second axially opposite sides extending from the engagement end to the convex end;
an electromagnet for actuating the strut, including a coil, a core and first and second axially spaced apart poles that each extend radially inward from the coil to respective first and second ends, the first end adjacent to the first side and the second end adjacent to the second side, a gap between the first end and the pocket plate being longer than a gap between the first end and said strut and a gap between the second end and the pocket plate being longer than a gap between the second end and the strut.

17. The coupling device of claim 16, wherein:
a portion of the first pole adjacent to the first end has a curvature that partially encircles and follows a contour of a curved portion of the convex end.

18. The coupling device of claim 16, wherein:
the pocket is formed with a concave surface having a first center about which the strut pivots;
the strut includes a second convex surface contacting the concave surface, the convex end having a second center that is spaced by a first length from the first center, and the cam engagement end is spaced by a second length from the second center, the second length being greater than the first length.

19. The coupling device of claim 18, wherein the second length is about four times greater than the first length.

20. The coupling device of claim 16, wherein the pocket plate is formed of material having a first magnetic permeability; and
further comprising a stop located in the pocket adjacent to the cam engagement end between said strut and the pocket plate such that the cam engagement end is prevented from contacting the pocket plate, the stop formed of material having second magnetic permeability less than the first magnetic permeability;
further comprising a stop located in the pocket adjacent to the cam engagement end between said strut and the pocket plate such that the cam engagement end is prevented from contacting the pocket plate, the stop formed of material having second magnetic permeability less than the first magnetic permeability.

* * * * *